US011009372B2

United States Patent
Klimenko

(10) Patent No.: US 11,009,372 B2
(45) Date of Patent: May 18, 2021

(54) STEERING ANGLE SENSOR WITH FUNCTIONAL SECURITY

(71) Applicants: Bourns, Inc., Riverside, CA (US); Valeri Klimenko, Rabensburg (AT)

(72) Inventor: Valeri Klimenko, Rabensburg (AT)

(73) Assignee: Bourns, Inc., Riverside, CA (US)

( * ) Notice: Subject to any disclaimer, the term of this patent is extended or adjusted under 35 U.S.C. 154(b) by 288 days.

(21) Appl. No.: 15/760,541

(22) PCT Filed: Sep. 1, 2016

(86) PCT No.: PCT/EP2016/070668
§ 371 (c)(1),
(2) Date: Mar. 15, 2018

(87) PCT Pub. No.: WO2017/045930
PCT Pub. Date: Mar. 23, 2017

(65) Prior Publication Data
US 2018/0259367 A1    Sep. 13, 2018

(30) Foreign Application Priority Data

Sep. 17, 2015   (DE) ................. 10 2015 115 686.5

(51) Int. Cl.
*G01D 5/244* (2006.01)
*G01D 5/04* (2006.01)
*G01D 5/245* (2006.01)

(52) U.S. Cl.
CPC ........... *G01D 5/24476* (2013.01); *G01D 5/04* (2013.01); *G01D 5/2452* (2013.01)

(58) Field of Classification Search
CPC ..... G01D 5/24476; G01D 5/04; G01D 5/2452
See application file for complete search history.

(56) References Cited

U.S. PATENT DOCUMENTS 5,930,905 A * 8/1999 Zabler ............ G01D 5/04 33/1 PT
6,466,889 B1   10/2002 Schodlbauer
(Continued)

FOREIGN PATENT DOCUMENTS

DE    19849554 C1    3/2000
DE    19962241 A1    7/2001
(Continued)

OTHER PUBLICATIONS

International Search Report and Written Opinion for Application No. PCT/EP2016/070668 dated Nov. 25, 2016 (7 pages).
(Continued)

*Primary Examiner* — Regis J Betsch
(74) *Attorney, Agent, or Firm* — Michael Best & Friedrich LLP

(57) ABSTRACT

The invention relates to a method for identifying a fault (96) in an angle sensor (24) which is designed to determine the angular position (18) of a shaft (14) based on an angular position difference (56) between a first output gear (32), which is driven by the shaft (14), and a second output gear (34), which is driven by the shaft (14), the output gears differing in respect of their diameter (34, 36), said method comprising:

Figure 1:
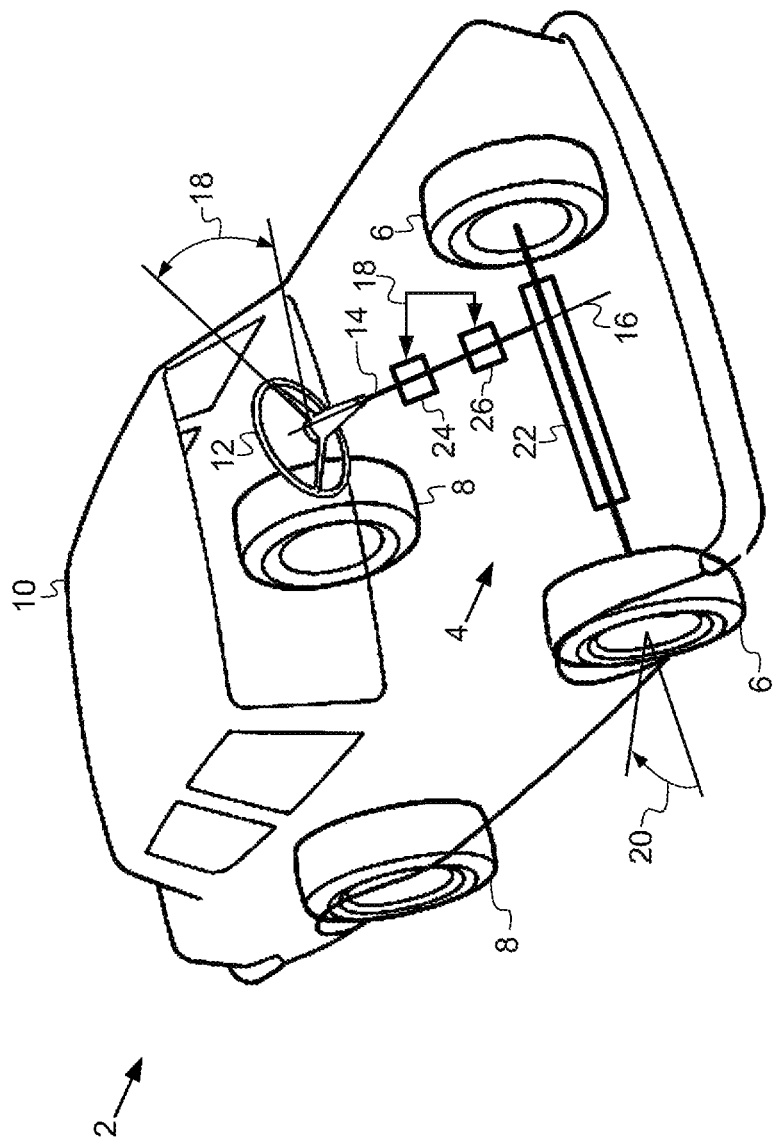

determining a reference value (18, 52) for the angular position (18) of the shaft (14) based on the angular position (42) of the first output gear (32), determining a comparison value (18', 52') for the angular position (18) of the shaft (14) based on the angular position (46) of the second output gear (34) and a transmission ratio (90) between the first output gear (32) and the second output gear (34), and (Continued)

identifying the fault (96) when a comparison (93, 94) of the reference value (18, 52) and the comparison value (18', 52') satisfies a predetermined condition (95).

10 Claims, 5 Drawing Sheets

(56) References Cited

U.S. PATENT DOCUMENTS

| | | | | |
|---|---|---|---|---|
| 6,507,188 | B1 * | 1/2003 | Dilger | B62D 15/02 |
| | | | | 324/207.21 |
| 9,903,703 | B2 * | 2/2018 | Zhou | G01B 7/30 |
| 2002/0111763 | A1 | 8/2002 | Koga | |
| 2003/0056583 | A1 | 3/2003 | Schodlbauer et al. | |
| 2005/0137768 | A1 | 6/2005 | Lee | |
| 2008/0051961 | A1 | 2/2008 | Ebashi et al. | |
| 2009/0295375 | A1 * | 12/2009 | Oohira | G01D 5/145 |
| | | | | 324/207.21 |
| 2012/0139532 | A1 | 6/2012 | Ueda et al. | |
| 2012/0283851 | A1 * | 11/2012 | Yamamoto | G05B 19/404 |
| | | | | 700/56 |
| 2015/0251698 | A1 * | 9/2015 | Schnieders | B62D 15/0215 |
| | | | | 74/409 |

FOREIGN PATENT DOCUMENTS

| | | | |
|---|---|---|---|
| EP | 1892498 A1 | 2/2008 | |
| JP | 2002213944 A | 7/2002 | |
| JP | 2010038682 * | 2/2010 | ............ G01B 7/30 |
| JP | 2010038682 A | 2/2010 | |
| JP | 201169806 A | 4/2011 | |
| JP | 2011145225 A | 7/2011 | |
| KR | 10-0824027 B1 | 4/2008 | |
| WO | 2017045930 A1 | 3/2017 | |

OTHER PUBLICATIONS

Chinese Patent Office Action for Application No. 201680054292.4 dated Aug. 14, 2020 (8 pages, statement of relevance included).

Chinese Patent Office Action for Application No. 201680054292.4 dated Nov. 25, 2019 (6 pages, English translation only).

European Patent Office Action for Application No. 16762762.9 dated May 6, 2020 (5 pages, statement of relevance included).

Japanese Patent Office Action for Application No. 2018-514288 dated Jun. 4, 2020 (7 pages, English translation only).

* cited by examiner

STEERING ANGLE SENSOR WITH FUNCTIONAL SECURITY

The present invention relates to a method for identifying a fault in an angle sensor, a control device for executing the method, the angle sensor, and a computer program.

An angle sensor for identifying the angular position of a shaft based on an angular position difference between a first output gear, which is driven by the shaft, and a second output gear, which is driven by the shaft, is known from DE 198 49 554 C1. The angle sensor comprises the first output gear and the second output gear. The first output gear has a diameter that differs from a diameter of the second output gear.

The angular position of the shaft is identified as being an angle that is beyond a full angle, i.e. an angle in a value range exceeding 360°. To this end, the angular position of the shaft can be determined directly by calculating the angular position of one of the output gears based on the angular position difference and multiplying this angular position by the transmission ratio between the shaft and the corresponding output gear. However, the directly determined angular position of the shaft exhibits non-linearities that are primarily due to output gears not being perfectly round, which means that the transmission ratio varies depending on the angular position of the output gears. Such angular-position-dependent changes in the transmission ratio are designated below as dynamic changes in the transmission ratio.

The angular position of the output gear is therefore alternatively determined as an angle that is beyond a full angle. To this end, the angular position of the output gear is first determined to the last full angle, which is a multiple of 360°. This filters out measurement errors by cutting off the decimal places. The angular position of the output gear is then determined as a real angle whose value lies in a range between 0° and 360°. Finally, the angular position of the output gear is then determined as a beyond-full angle by adding together the last full angle and the real angle. Although the angular position of the output gear that is determined using this alternative method is more accurate than the directly determined angular position of the output gear, if decimal-place errors occur in the region of a full angle, the cutting off of the decimal places may cause the last full angle to be determined incorrectly and thus result in jumps in the period number. Here, the period number is a round count value that specifies how many revolutions the output gear has gone through.

In order to determine these jumps in the period number, the directly determined angular position of the output gear and the alternatively determined angular position of the output gear are plausibility-checked against each other. The impact of the jumps in the period number on the angular position of the corresponding output gear and thus on the angular position of the shaft can then be corrected using a period number correction.

However, despite this period number correction, jumps in the angular position of the shaft—referred to as angular jumps—continue to occur. In addition to being problematic, such angular jumps cannot always be reliably detected, for example if the angular jump occurs upon activation of the sensor and no past values for the angular position of the shaft are available for detecting the angular jump.

The object of the invention is to specify a method for identifying a fault in an angle sensor with which the above-mentioned angular jumps can be reliably detected, even if there are no past values available.

According to one aspect of the invention, a method for identifying a fault in an angle sensor which is designed to determine the angular position of a shaft based on an angular position difference between a first output gear, which is driven by the shaft, and a second output gear, which is driven by the shaft, the output gears differing in respect of their diameter, comprises the steps of determining a reference value for the angular position of the shaft based on the angular position of the first output gear, determining a comparison value for the angular position of the shaft based on the angular position of the second output gear and a transmission ratio between the first output gear and the second output gear, and identifying the fault when a comparison of the reference value and the comparison value satisfies a predetermined condition.

The specified method is based on the idea that the period jumps of the type mentioned above occur due to the determination of the angular positions of the output gears not being ideally linear, which then leads to jumps in the angular position difference and necessitates the above-mentioned period number correction. As with the above-mentioned dynamic changes in the transmission radio, the detection of these angular positions not being ideally linear is also due to the output gears not being perfectly round. The period number correction corrects the dynamic changes in the transmission ratio over time.

However, the period number correction requires the transmission ratio between the two output gears to remain constant as viewed over time.

This requirement cannot always be considered to be met, as in addition to the detection of the angular position of the output gears not being ideally linear, the angle sensor is also subjected in principle to ageing, which changes the mechanical and electrical components. As a result, the transmission ratio changes over time, meaning that the entire measurement path for determining the angular position of the shaft also changes. The mathematical boundary conditions for determining the angular position of the shaft are therefore no longer correct. If the transmission ratio of the two output gears changes due to signs of ageing and/or fatigue over the long term, this therefore also gives rise to the angular jumps mentioned above. This can be especially problematic if the angle sensor is not switched on and the transmission ratio between the two output gears changes. In this case, when the angle sensor is switched on, no angular jump is immediately detected as no comparison values are available. This is the case for example in a vehicle that is parked for a long period without any supply of electrical energy.

The stated method therefore monitors the transmission ratio between the two output gears for long-term changes. Here, both the angular position of the first output gear and the position of the second output gear are recorded, as this enables checking of the transmission ratio between the two output gears. If the above-mentioned mathematical boundary conditions for the determination of the angular position of the shaft are correct and no long-term changes have occurred in the transmission ratio, then angular positions of the two output gears must be redundant and all calculations based on them would lead to the same result.

A predetermined condition for the transmission ratio between the two output gears provides a decision-making criterion for determining the point from which the ratios in the measurement path are incorrect to the extent that sufficiently precise determination of the angular position of the shaft is no longer possible. As the transmission ratio between the two output gears is a design parameter, the predetermined condition on which it is based may be stored in the form of comparison values or the like on a non-volatile memory such as a ROM and accessed at any time, including after longer periods of vehicle downtime with no power supply. As a result, the angular jumps in the angle sensor and thus any faults can always be detected.

In a further refinement of the stated method, a round count value, which is determined on the basis of the angular position difference, for the first output gear and the angular position of the first output gear are added together. Recording the round count value, which—as explained above—corresponds to the above-mentioned period number, does not require the sensor element used for this process to have a high level of precision.

Solely in the case where a full revolution is approached, it must be ensured that a clear decision is made to undergo a new revolution or turn, so that no angular jumps occur when measuring the angular position of the output gear and thus also the shaft.

In an additional further refinement of the stated method, in order to determine the comparison value, a redundant reference value is generated from a sum of a round count value, which is determined on the basis of the angular position difference, for the second output gear and the angular position of the second output gear through weighting with the transmission ratio. This means that the angular position of the second output gear is converted into the position of the first output gear via the transmission ratio. Here, the transmission ratio can be described using a predetermined value with which the transmission ratio was dimensioned when designing the angle sensor. The comparison of the reference value and the comparison value generated in this manner can now be tested to determine whether it satisfies a predetermined condition. If, for example, the two values are divided into each other for the purpose of the comparison, the predetermined condition may be satisfied if the quotient is too far from one.

As division is a very costly operation from a computing standpoint, an expedient further refinement of the stated method provides that the comparison comprises the formation of a difference between the reference value and the comparison value, wherein the predetermined condition is satisfied if the difference formed leaves a predetermined value range. In this manner, a simple logic circuit can be used to monitor whether or not the comparison satisfies the predetermined condition. In another refinement, the stated method comprises the step of saving the comparison formed, preferably the difference, in a memory. This also enables the comparison to be evaluated, for example, in order to detect possible wear of the angle sensor during servicing of a vehicle, so that the angle sensor can be replaced before it fails.

Although the comparison can in principle be stored in any manner, for example over time, a particularly preferred further refinement of the stated method provides that the comparison comprises the above-mentioned difference and is only saved in the memory if a value of a difference stored in the memory is smaller than a value of the difference formed. In this manner, the storage space needed to save the comparison can be minimised.

In an alternative further refinement of the stated angle sensor, the angular positions of the output gears are detected using magnetoresistive sensors, each of which has two separate measuring transducers which each output one encoder signal, wherein the fault in the angle sensor is further identified on the basis of a relative position of the two measuring transducers in each of the sensors. If both measuring transducers in a sensor are each arranged offset by 90° to the corresponding output gear, the relative position of both sensors can expediently be monitored on the basis of the orthogonality of the encoder signals and, if orthogonality is not present, this fault can be decided upon. The resistance of the angle sensor to faults can thus be further increased in this manner.

According to another aspect of the invention, a control device is designed to carry out one of the stated methods.

In a further refinement of the stated device, the stated device has a memory and a processor. The stated method is saved in the memory in the form of a computer program and the processor is provided for executing the method when the computer program is loaded from the memory into the processor.

According to another aspect of the invention, an angle sensor for determining the angular position of a shaft based on an angular position difference between a first output gear, which is driven by the shaft, and a second output gear, which is driven by the shaft, comprises the first output gear, the second output gear, which has a diameter that differs from a diameter of the first output gear, and one of the stated control devices.

According to another aspect of the invention, a computer program comprises program code resources for executing all the steps of the stated method when the computer program is executed on an electronic device or one of the specified devices.

According to another aspect of the invention, a computer program product contains a program code which is saved on a computer-readable data carrier and which carries out the stated method when it is executed on a data processing device.

Figure 2:
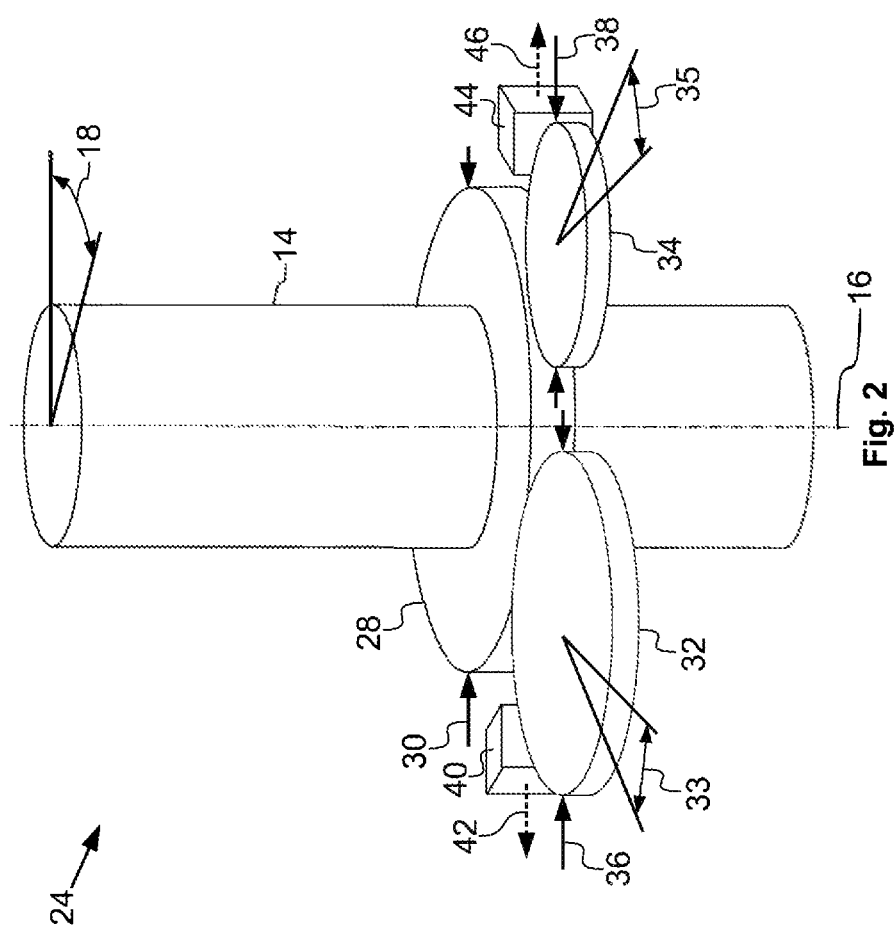
Figure 3:
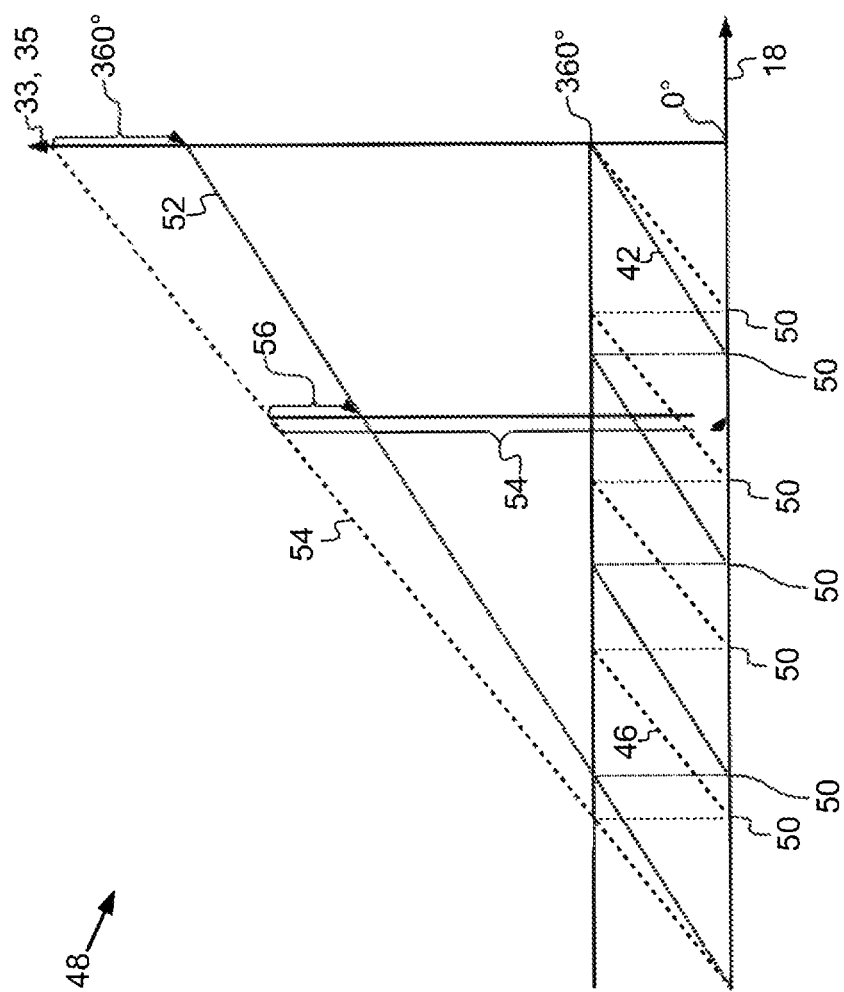
Figure 4:
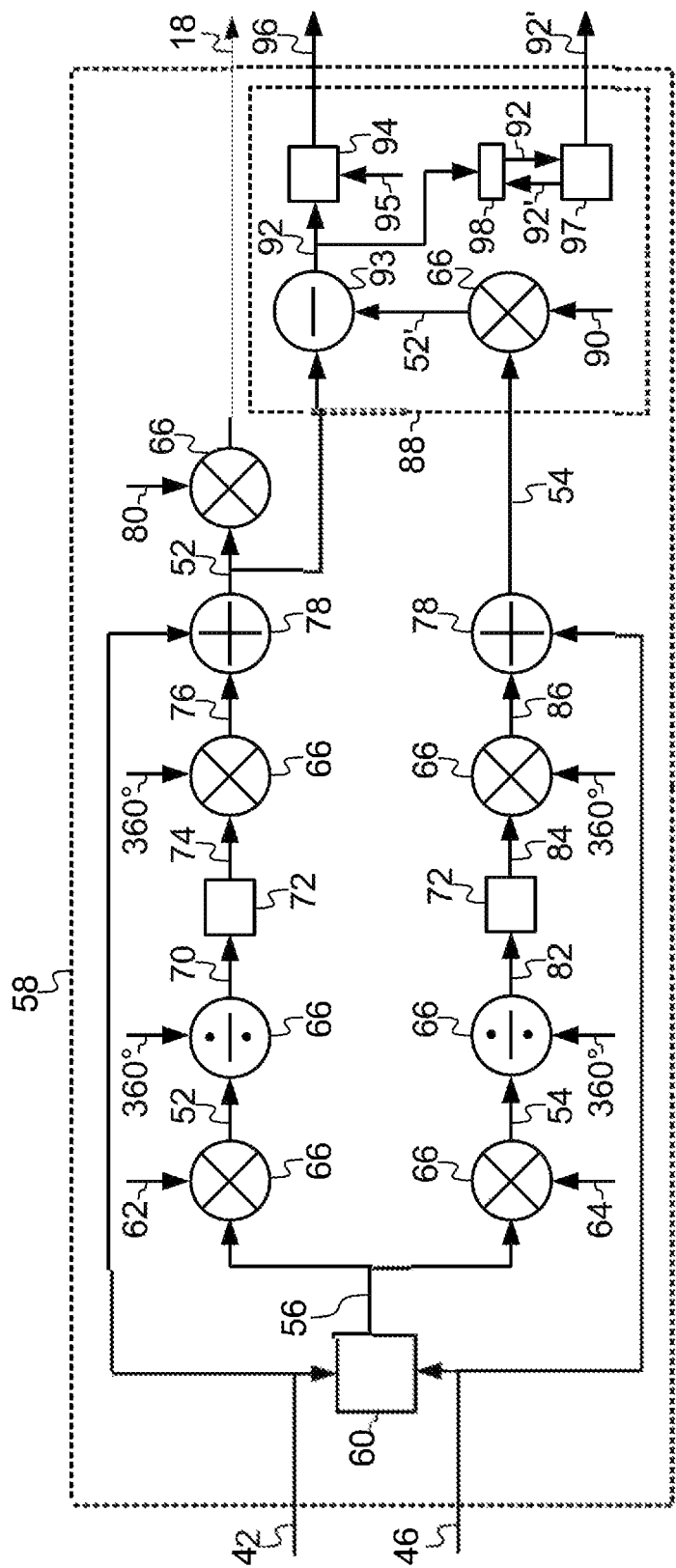
Figure 5:
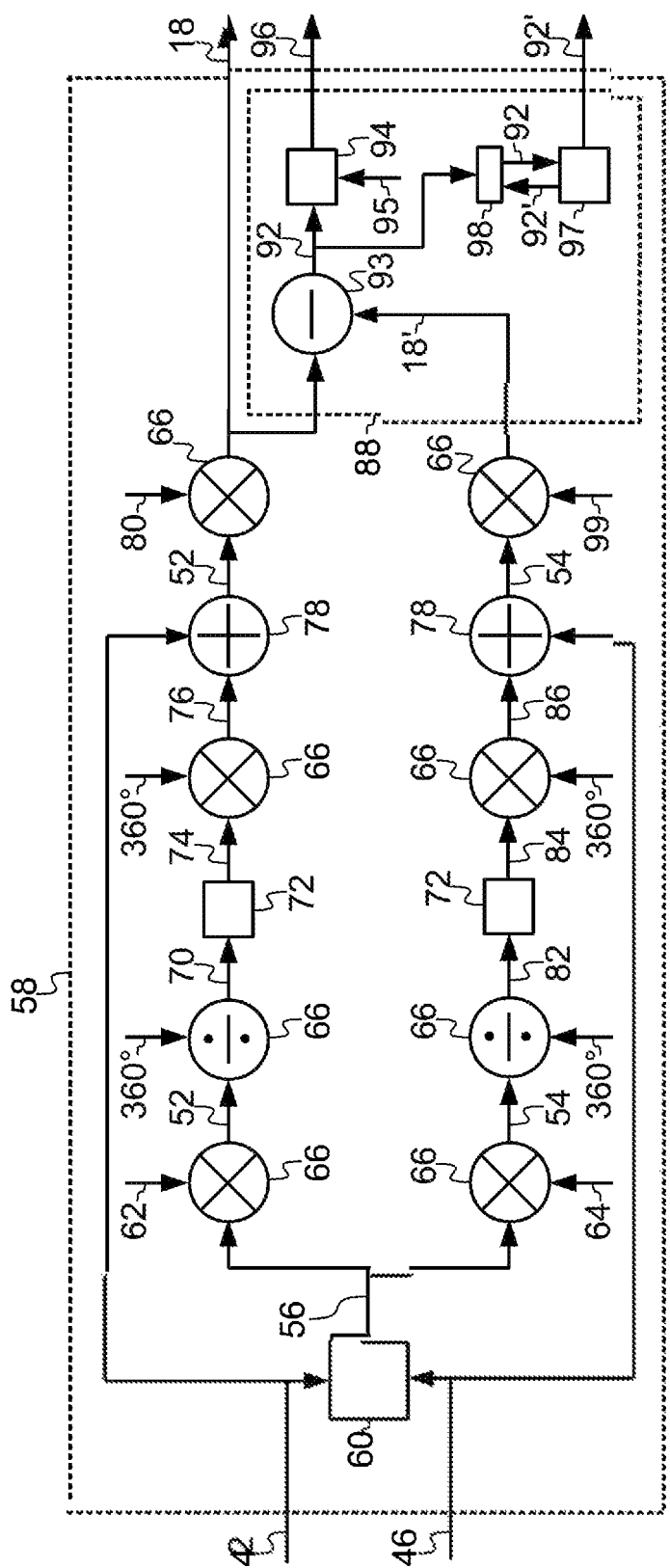

The above-described properties, features and benefits of this invention and the manner in which they are achieved will be made clearer in connection with the following description of the exemplary embodiments, which are described in more detail in connection with the drawing. In the figures:

FIG. 1 is a schematic representation of a perspective view of a vehicle with a steering system, FIG. 2 is a schematic representation of a perspective view of a steering angle sensor for the steering system from FIG. 1, FIG. 3 shows a diagram in which the angles of output gears in the steering angle sensor from FIG. 2 are plotted against a steering angle of the steering angle system from FIG. 1, FIG. 4 is a schematic representation of a control device in the steering angle sensor from FIG. 2, and FIG. 5 is a schematic representation of an alternative control device in the steering angle sensor from FIG. 2.

In the figures, the same technical elements are provided with the same reference signs and are only described once. The figures are purely schematic and, in particular, do not reflect the actual geometric proportions.

Reference is made to FIG. 1, which is a schematic representation of a perspective view of a vehicle 2 with a steering system 4.

In the present exemplary embodiment, the vehicle 2 comprises a chassis 10 supported by two front wheels 6 and two rear wheels 8. The front wheels 6 can be impinged upon by the steering system 4 so that the vehicle 2 can be driven on a bend.

The steering system 4 comprises a steering wheel 12 which is mounted on a steering shaft 14, which in turn is mounted pivotably around a rotation axis 16. The steering wheel 12 is thus configured to prescribe a steering angle 20 based on a steering shaft angle 18 about the rotation axis 16, with which a steering gear 22 is to impinge on the front wheels 6 for driving on a bend. To this end, the steering wheel 12 is for example turned by a driver of the vehicle 2.

In the present embodiment, the steering shaft angle 18 is detected by a steering angle sensor 24. Using the detected steering shaft angle 18, a drive unit 26 thus actuates the steering gear 12 such that the front wheels 6 of the vehicle 2 are impinged upon with the corresponding steering angle 20.

Reference is made to FIG. 2, which is a schematic representation of a perspective view of the steering angle sensor 24 for the steering system 4 from FIG. 1.

The steering angle sensor 24 comprises a drive gear 28 with a drive gear diameter 30, which drive gear 28 is fixed in place and concentrically connected to the steering shaft 14, and therefore also rotates about the rotation axis 16 when the steering shaft 14 is turned. The drive gear 28 is thereby also adjusted along with the steering shaft angle 18.

For the purpose of metrological determination of the steering shaft angle 18, the drive gear 28 drives, when rotating with the steering shaft 14, a first output gear 32 and a second output gear 34, which output gears are arranged at various circumferential positions around the edge of the drive gear 28. Thus, via the drive gear 28, the steering shaft 14 turns the first output gear 32 about a first output gear angle 33 and the second output gear 34 about a second output gear angle 35 when it rotates with the steering shaft angle 18.

The first output gear 32 has a first output gear diameter 36 which is larger than a second output gear diameter 38 of the second output gear 34. Both output gear diameters 36, 38 are smaller than the drive gear diameter 30. Consequently, when the steering shaft 14 is turned, the drive gear 28 rotates the slowest and the second output gdrive unit 26 thus actuates the steering gear 12 such that the front wheels 6 of the vehicle 2 are impinged upon with the corresponding steering angle 20.

Reference is made to FIG. 2, which is a schematic representation of a perspective view of the steering angle sensor 24 for the steering system 4 from FIG. 1.

The steering angle sensor 24 comprises a drive gear 28 with a drive gear diameter 30, which drive gear 28 is fixed in place and concentrically connected to the steering shaft 14, and therefore also rotates about the rotation axis 16 when the steering shaft 14 is turned. The drive gear 28 is thereby also adjusted along with the steering shaft angle 18.

For the purpose of metrological determination of the steering shaft angle 18, the drive gear 28 drives, when rotating with the steering shaft 14, a first output gear 32 and a second output gear 34, which output gears are arranged at various circumferential positions around the edge of the drive gear 28. Thus, via the drive gear 28, the steering shaft 14 turns the first output gear 32 about a first output gear angle 33 and the second output gear 34 about a second output gear angle 35 when it rotates with the steering shaft angle 18.

The first output gear 32 has a first output gear diameter 36 which is fear 34 rotates the fastest.

By way of a comparison of the output gear angles 33, 35 of the two output gears 32, 34, the steering shaft angle 18 can now be recorded in an angle range that goes beyond 360°—in other words, the steering shaft angle 18 of the steering shaft 14 can be recorded over multiple full angles. In order to compare the output gear angles 33, 35 of the two output gears 32, 34, a first measuring transducer 40 is used to record first real output gear angle values 42 for the first output gear angle 33 and a second measuring transducer 44 is used to record second real output gear angle values 46 for the second output gear angle 35. Further details on the comparison of the output gear angles 33, 35 are described at a later juncture.

In order to record the real output gear angle values 42, 46, the output gears 32, 34 may be encoded in the circumferential direction in a known manner, for example using magnetic equipment. The two measuring transducers 40, 44 are arranged fixed in place in relation to the output gears 32, 34. When the output gears 32, 34 rotate, the encoding changes from the perspective of the respective measuring transducer 40, 44, so that they record their corresponding real output gear angle values 42, 46 and output them in a suitable signal. As this is known per se, no further details shall be provided here.

The comparison of the real output gear angle values 42, 46 and the determination of the steering shaft angle 18 based on this will be explained below with the aid of FIG. 3, which shows a diagram 48 in which the output gear angle values 42, 46 of the first output gear angle 33 and of the second output gear angle 35 are plotted against the steering angle 18 of the steering shaft 14.

The profile of the first real output gear angle values 42 is plotted as dotted lines, while the profile of the second real output gear angle values 46 is plotted as dashed lines. It can be clearly seen that, for metrological reasons, the real output gear angle values 42, 46 always increase up to a full angle 50 of 360° and then start again at 0°.

For the sake of clarity, in the diagram 48 the profile of the first output gear angle 33 is plotted as the first beyond-full output gear angle values 52 and the profile of the second output gear angle 35 is plotted as the second beyond-full output gear angle values 54. Starting from a zero position not shown in more detail in FIG. 2, the beyond-full output gear angle values 52, 54 specify the position of the respective output gear 32, 34 over an angle range of greater than 360°, so that the number of revolutions of the respective output gear 32, 34 is also discernible from the beyond-full output gear angle values 52, 54.

It can be seen in the diagram 48 that, as seen over the steering angle 18, the second output gear 34 rotates faster than the first output gear 32. This is because the first output gear 32 has a first output gear diameter 36 which is larger than the second output gear diameter 38 of the second output gear 34.

An essential aspect of the diagram 48 in FIG. 3 is that a difference 56 between the two beyond-full output gear angle values 52, 54 can be unambiguously assigned to the two beyond-full output gear angle values 52, 54. FIG. 3 shows by way of example an assignment between one of the two beyond-full output gear angle values 54 and the determined difference 56. Thus, if the difference 56 is known, the beyond-full output gear angle value 52, 54 of at least one of the two output gears 32, 34 can also be determined.

The difference 56 can in principle also be determined on the basis of the real output gear angle values 42, 46, in which case it must be taken into consideration that the difference 56 between positive and negative values jumps if one of the two output gear angles 33, 35 exceeds a full angle 50. This is described for example in DE 198 49 554 C1. However, these value jumps can be taken into consideration for example by generating the absolute value of the difference 56. The difference 56, and thus the beyond-full output gear angle value 52, 54 of one of the two output gears 32, 34 can therefore be determined solely based on the two measuring transducers 40, 44 which record the real output gear angle values 42, 46. A specific embodiment will be described later on with the aid of FIG. 4.

If the beyond-full output gear angle value 52, 54 of one of the two output gears 32, 34 is known, the steering shaft angle 18 can be deduced from the ratio between the corresponding output gear diameter 36, 38 and the drive gear diameter 30, because the steering shaft angle 18 is proportionally dependent on the corresponding beyond-full output gear angle value 52, 54 via this ratio.

As angular jumps in the steering shaft angle 18 can occur in practice due to measurement errors when detecting the real output gear angle values 42, 46, which angular jumps shall not be discussed further here for the sake of brevity, the previously determined beyond-full output gear angle value 52, 54 can first be used to determine the number of full revolutions of the corresponding output gear 32, 34, to which the real output gear angle value 42, 46 is then added. To this end, the beyond-full output angle value 52, 54 of one of the two output gears 32, 34 is first determined and divided by a full angle of 360°. This results in a standardised round count value that describes the number of revolutions of the corresponding output gear 32, 34, including using decimal places to describe turns between two full angles. All the decimal places are removed from this round count value by way of integer formation, where the number of full revolutions of the corresponding output gear 32, 34 is defined as a real round count value. The corresponding real output gear angle value 42, 46 of the corresponding output gear 32, 34 is then added to this real round count value, which also results in the beyond-full output angle value 52, 54 of the corresponding output gear 32, 34, from which in turn the steering shaft angle 18 can then be determined.

In principle, no more angular jumps should occur when the steering shaft angle 18 is determined in this manner. However, angular jumps do occur in practice. The reason for this is that the steering shaft angle 18 is dependent not only on the two real (recorded with measurement errors) output gear angle values 42, 46, but also on the internal properties of the steering angle sensor 24, such as the transmission ratios between the individual gears 28, 32, 34. As these internal properties are subjected to ageing and/or wear, they change and likewise result in measurement errors when detecting the steering shaft angle 18.

However, these measurement errors can be discovered by monitoring the internal properties of the steering angle sensor 26, and can be indicated if necessary.

With the aid of FIG. 4, a control device 58 is described below which carries out the above-described method for determining the steering shaft angle 18 while simultaneously implementing the above-described principle for identifying measurement errors due to ageing and/or wear.

The control device 58 receives the two real output gear angle values 42, 46 and determines the difference 56 using a special subtractor 60. For the reasons described above, a normal subtractor cannot be used here as jumps occur when performing subtraction on the real output gear angle values 42, 46 if each of the output gears 32, 34 passes a full angle 50.

Based on the difference 56, the control device 58 then calculates the first beyond-full output gear angle value 52 of the first output gear 32 and the second beyond-full output gear angle value 54 of the second output gear 34. The above-described functional relationship between the difference 56 and the two beyond-full output gear angle values 52, 54 is proportional. The proportionality factor is a total round number 62, 64 through which the respective output gear 32, 34 turns between two identical relative positions of the two output gears 32, 34 in relation to each other.

The calculation of the first beyond-full output gear angle value 52 shall firstly be described. In order to determine the first beyond-full output gear angle value 52 imprecisely and with measurement errors, the control device 58 multiplies the difference 56 with the first total round number 62 in a multiplier 66. The control device 58 then divides the imprecisely determined first beyond-full output gear angle value 52 by 360° in a divider 68 in order to determine an above-described first standardised round count value 70 for the first output gear 32. In an integer unit 72, the control device 58 then cuts off the decimal places from the first standardised round count value 70 and thus calculates the first real round count value 74 of the first output gear 32. The control device 58 then multiplies this first round count value 74 by a full angle of, for example, 360° in another multiplier 66, and thus calculates the first full angle 76 last passed by the first output gear 32. The control device 58 then uses an adder 78 to add this last-passed first full angle 76 to the first real output gear angle value 42 of the first output gear 32, thus obtaining the precise first beyond-full output gear angle value 52 of the first output gear 32. Finally, to determine the steering shaft angle 18, the control device 58 uses a multiplier 66 to multiply the first beyond-full output gear angle value 52 of the first output gear 32 and a first transmission ratio 80 between the drive gear 28 and the first output gear 32. This first transmission ratio 80 corresponds to the ratio between the drive gear diameter 30 and the first output gear diameter 36.

The calculation of the second beyond-full output gear angle value 54 shall now be described. In order to determine the second beyond-full output gear angle value 54 imprecisely and with measurement errors, the control device 58 multiplies the difference 56 with the second total round number 64 in a multiplier 66. The control device 58 then divides the imprecisely determined second beyond-full output gear angle value 52 by 360° in a divider 68 in order to determine an above-described second standardised round count value 84 for the second output gear 34. In an integer unit 72, the control device 58 then cuts off the decimal places from the second standardised round count value 82 and thus calculates the second real round count value 84 of the second output gear 34. The control device 58 then multiplies this second round count value 84 by a full angle of, for example, 360° in another multiplier 66, and thus calculates the second full angle 86 last passed by the second output gear 34. The control device 58 then uses an adder 78 to add this last-passed second full angle 86 to the second real output gear angle value 46 of the second output gear 34, thus obtaining the precise second beyond-full output gear angle value 54 of the second output gear 34. Redundant determination of the steering shaft angle 18 is not required in order to carry out the method in the control device 58.

The control device 18 now treats the first beyond-full output gear angle value 52 as the reference value for the steering shaft angle 18 and subjects it to a plausibility check in a detection device 88 based on the second beyond-full output gear angle value 54. An exemplary configuration of this detection device 88 is described below.

The detection device 88 in the control device 58 first converts the second beyond-full output gear angle value 54 into a comparison value for the reference value. In the fault-free case, this should be as large as the first beyond-full output gear angle value 52. For the sake of clarity, the comparison value is therefore denoted by the reference sign 52'.

To determine the comparison value 52', the detection device 88 multiplies the second beyond-full output angle value 54 by a transmission ratio 90 between the first output gear 32 and the second output gear 34. In this way, the second beyond-full output gear angle value 54 is converted into the first beyond-full output gear angle value 52. If the transmission ratio between the two output gears 32, 34 is correct, then the internal properties of the steering angle sensor 24 and thus also, for example, the total round numbers 62, 64, which the control device 58 of the steering angle sensor 24 uses to determine the steering angle 18, are also correct. In such a case, no angular jumps as described above occur.

In order to check whether the transmission ratio between the two output gears 32, 34 is correct, the detection device 88 in the control device 58 compares the reference value 54 and the comparison value 54' by forming a comparison difference 92 using a subtractor 93, and uses a checking unit 94 to check whether the comparison difference 92 is smaller than a predetermined limit 95. If the comparison difference 92 exceeds this limit 95, the checking unit 94 can emit a warning signal 96 that can then be emitted from the steering angle sensor 24 for the purpose of signalling, for example for maintenance purposes.

Alternatively or in addition, the comparison difference 92 can also be stored in a memory 97. The stored comparison difference 92' can then be called up from this memory 97 for maintenance purposes, for example. Optionally, an interface can be provided for comparing a previously stored comparison difference 92' with a new comparison difference 92 that is to be stored, and the saving process can take place only under specific conditions, for example if the stored comparison difference 92' is smaller than the new comparison difference 92 that is to be stored.

In the above-described embodiment, the first beyond-full output gear angle value 52 is used as a reference value for the steering shaft angle 18 and the second beyond-full output gear angle value 54 is used as the basis for determining the comparison value in the control device 58. Alternatively, however, the steering angle 18 could also be redundantly determined in the control device 58 and monitored for faults in the detection device 88. This is shown by way of example in FIG. 5. In this case, the second beyond-full output gear angle value 54 is multiplied not by the second transmission ratio 90 but by a third transmission ratio 99 which describes the transmission between the second output gear 34 and the drive gear 28. In this manner, a redundant steering shaft angle 18' is determined directly. The steering shaft angle 18 could now be used as a reference value and the redundant steering shaft angle 18' as a comparison value.

As explained above, the two measuring transducers 40, 42 can be embodied as magnetic measuring transducers. If the measuring transducers 40, 42 are based on AMR technology, the orthogonality of the encoder signals from the measuring transducers 40, 42 can also be used to monitor the steering angle sensor 24 in order to determine whether it is functioning correctly. This monitoring can then be used together with the output signals from the detection device 88 in order to achieve a higher degree of reliability, in accordance with ASIL-D, for example.

The invention claimed is:

1. A method for identifying a fault in an angle sensor which is designed to determine the angular position of a shaft based on an angular position difference between a first output gear, which is driven by the shaft, and a second output gear, which is driven by the shaft independently from the first output gear, the output gears differing in respect of their diameter, said method comprising:
   determining a reference value for the angular position of the shaft based on the angular position of the first output gear,
   determining a comparison value for the angular position of the shaft based on the angular position of the second output gear and a transmission ratio between the first output gear and the second output gear, and
   identifying the fault when a comparison of the reference value and the comparison value satisfies a predetermined condition.

2. The method as claimed in claim 1, wherein, in order to determine the reference value, a round count value, which is determined on the basis of the angular position difference, for the first output gear and the angular position of the first output gear are added together.

3. The method as claimed in claim 1, wherein, in order to determine the comparison value, a redundant reference value is generated from a sum of a round count value, which is determined on the basis of the angular position difference, for the second output gear and the angular position of the second output gear through weighting with the transmission ratio.

4. The method as claimed in claim 1, wherein the comparison comprises the formation of a difference between the reference value and the comparison value, and wherein the predetermined condition is satisfied if the difference formed leaves a predetermined value range.

5. The method as claimed in claim 4, comprising saving the difference formed in a memory.

6. The method as claimed in claim 5, wherein the difference is only saved in the memory if a value of a difference stored in the memory is smaller than a value of the difference formed.

7. The method as claimed in claim 1, wherein the angular positions of the output gears are detected using magnetoresistive sensors, and wherein the fault in the angle sensor is further identified on the basis of an orthogonality of the output signals of the magnetoresistive sensors, which output signals describe the angular positions.

8. A control device including a computer and for identifying a fault in an angle sensor which is designed to determine the angular position of a shaft based on an angular position difference between a first output gear, which is driven by the shaft, and a second output gear, which is driven by the shaft independently from the first output gear, the output gears differing in respect of their diameter, the computer configured to determine a reference value for the angular position of the shaft based on the angular position of the first output gear, determine a comparison value for the angular position of the shaft based on the angular position of the second output gear and a transmission ratio between the first output gear and the second output gear, and identify the fault when a comparison of the reference value and the comparison value satisfies a predetermined condition.

9. An angle sensor for determining the angular position of a shaft based on an angular position difference between a first output gear, which is driven by the shaft, and a second output gear, which is driven by the shaft independently from the first output gear, comprising the first output gear, the second output gear, which has a diameter that differs from a diameter of the first output gear, and a control device configured to determine a reference value for the angular position of the shaft based on the angular position of the first output gear, determine a comparison value for the angular position of the shaft based on the angular position of the second output gear and a transmission ratio between the first output gear and the second output gear, and identify the fault when a comparison of the reference value and the comparison value satisfies a predetermined condition.

10. A non-transitory computer-readable medium comprising programming instructions that, when executed on a computer cause the computer to determine a reference value for the angular position of the shaft based on the angular position of the first output gear, determine a comparison value for the angular position of the shaft based on the angular position of the second output gear which is driven by the shaft independently from the first output gear and a transmission ratio between the first output gear and the second output gear, and identify the fault when a comparison of the reference value and the comparison value satisfies a predetermined condition.

* * * * *